ns Patent [19]

Campbell et al.

[11] Patent Number: 5,068,286

[45] Date of Patent: Nov. 26, 1991

[54] COPOLYMERS FROM NUCLEOPHILIC OLEFIN POLYMERS AND EPOXYTRIAZINE-CAPPED POLYPHENYLENE ETHERS

[75] Inventors: John R. Campbell, Clifton Park; Timothy J. Shea, Schenectady; Stanley Y. Hobbs, Scotia; Sterling B. Brown, Schenectady, all of N.Y.

[73] Assignee: GE Plastics Japan Ltd., Japan

[21] Appl. No.: 316,059

[22] Filed: Feb. 27, 1989

[51] Int. Cl.[5] .................. C05L 53/02; C05L 71/12
[52] U.S. Cl. .................................. 525/92; 525/68; 525/132; 525/396; 525/397; 525/905
[58] Field of Search ............ 525/68, 92, 905, 132, 525/396, 397

[56] References Cited

U.S. PATENT DOCUMENTS 4,460,743  7/1984  Abe et al. .................. 525/68
4,716,199 12/1987  van der Meer ............ 525/92
4,895,945  1/1990  Brown et al. ............... 544/218

Primary Examiner—Jacob Ziegler
Attorney, Agent, or Firm—William H. Pittman; James C. Davis, Jr.

[57] ABSTRACT

Polyphenylene ether-olefin polymer copolymer compositions are prepared by the reaction of an epoxytriazine-capped polyphenylene ether with an olefin polymer containing highly nucleophilic (e.g., carboxylic acid) substituents. The copolymers have excellent properties and find utility as molding compositions and as compatibilizers for blends of similar polymers. Suitable epoxytriazine-capped polyphenylene ethers may be prepared by reaction of a polyphenylene ether with an epoxychlorotriazine such as diglycidyl chlorocyanurate, n-butyl glycidyl chlorocyanurate or mesityl glycidyl chlorocyanurate.

23 Claims, No Drawings

COPOLYMERS FROM NUCLEOPHILIC OLEFIN POLYMERS AND EPOXYTRIAZINE-CAPPED POLYPHENYLENE ETHERS

This invention relates to the preparation of copolymers of polyphenylene ethers and functionalized olefin polymers.

The polyphenylene ethers are a widely used class of thermoplastic engineering resins characterized by excellent hydrolytic stability, dimensional stability, toughness, heat resistance and dielectric properties. However, they are deficient in certain other properties such as melt flow characteristics, solvent resistance and impact strength. Therefore, there is a continuing search for means for modifying polyphenylene ethers to improve these other properties.

It is known that under certain conditions, melt flow, solvent resistance and impact strength of polyphenylene ethers can be improved by the addition of olefin polymers such as polyethylene and polypropylene. However, olefin polymers are basically incompatible with polyphenylene ethers and their incorporation therein in more than very small proportions results in blends which undergo phase separation and delamination. They typically contain large, incompletely dispersed polyphenylene ether particles and no phase interaction between the two resin phases.

The present invention provides copolymers of polyphenylene ethers and a class of olefin polymers. Said copolymers are formed from highly reactive epoxy-functionalized polyphenylene ethers which may be prepared under simple solution or interfacial conditions using relatively inexpensive reagents. The copolymers have excellent physical properties, particularly when blended with conventional impact modifiers for polyphenylene ethers. They also find potential use as compatibilizers for blends containing unfunctionalized polyphenylene ethers.

Accordingly, the invention includes compositions comprising copolymers prepared by the reaction of a polyphenylene ether containing epoxytriazine groups with at least one aliphatic olefin polymer containing highly nucleophilic substituents.

The polyphenylene ethers used in the preparation of the compositions of this invention are characterized by the presence of epoxytriazine groups. These groups are usually present as caps on the polyphenylene ether chain, but may also be located elsewhere in the polymer molecule.

Epoxytriazine-capped polyphenylene ethers, as well as methods for their preparation, are disclosed and claimed in copending application Ser. No. 351,905, filed May 15, 1989. They comprise polymer molecule having end groups of the formula

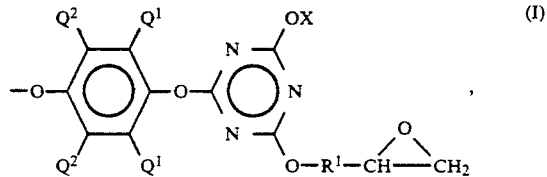

wherein:
each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms;
each $Q^2$ is independently hydrogen, halogen, primary or secondary lower alkyl, phenyl, haloalkyl, hydrocarbonoxy or halohydrocarbonoxy as defined for $Q^1$;
X is an alkyl, cycloalkyl or aromatic radical or

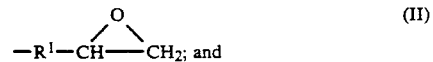

$R^1$ is a divalent aliphatic, alicyclic, heterocyclic or unsubstituted or substituted aromatic hydrocarbon radical.

Said epoxytriazine-capped polyphenylene ethers may be prepared as described hereinafter from the polyphenylene ethers known in the art. The latter encompass numerous variations and modifications all of which are applicable to the present invention, including but not limited to those described hereinafter.

The polyphenylene ethers comprise a plurality of structural units having the formula

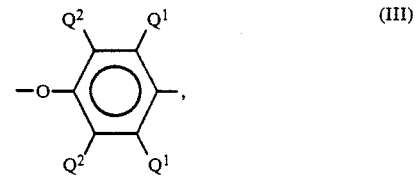

and in each of said units independently, each $Q^1$ and $Q^2$ is as previously defined. Examples of primary lower alkyl groups suitable as $Q^1$ and $Q^2$ are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present.

Illustrative coupling agents are low molecular weight polycarbonates, quinones, heterocycles and formals.

The polyphenylene ether generally has a number average molecular weight within the range of about 3,000-40,000 and a weight average molecular weight within the range of about 20,000-80,000, as determined by gel permeation chromatography. Its intrinsic viscosity is most often in the range of about 0.35-0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

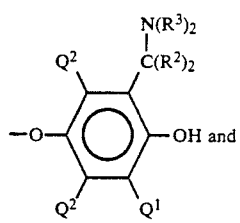
(IV)

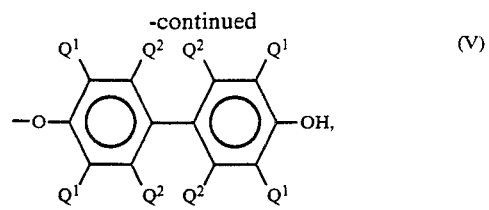
(V)

wherein $Q^1$ and $Q^2$ are as previously defined; each $R^2$ is independently hydrogen or alkyl, with the proviso that the total number of carbon atoms in both $R^2$ radicals is 6 or less; and each $R^3$ is independently hydrogen or a $C_{1-6}$ primary alkyl radical. Preferably, each $R^2$ is hydrogen and each $R^3$ is alkyl, especially methyl or n-butyl.

Polymers containing the aminoalkyl-substituted end groups of formula IV may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy groups on the terminal unit of the polymer chain. During further processing and/or blending, the aminoalkyl-substituted end groups may undergo various reactions, probably involving a quinone methide-type intermediate of the formula

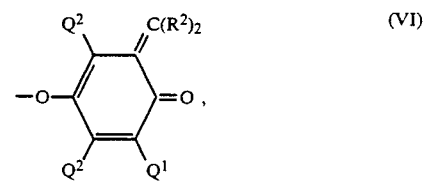
(VI)

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula V are typically obtained from reaction mixtures in which a by-product diphenoquinone of the formula

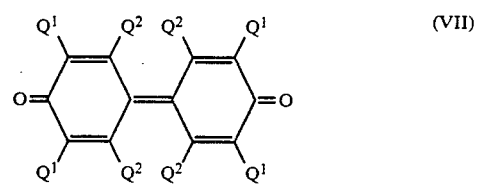
(VII)

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by wight of the polymer, contain end groups having one or frequently both of formulas IV and V. It should be understood, however, that other end groups may be present and that the invention in its broadest sense may not be dependent on the molecular structures of the polyphenylene ether end groups, provided a substantial proportion of free hydroxy groups is present.

The end groups on the epoxytriazine-capped polyphenylene ethers have formula I, in which $Q^1$ and $Q^2$ are as previously defined. X may be an alkyl or cycloalkyl radical, typically lower alkyl and especially primary or secondary lower alkyl; an aromatic radical, typically monocyclic and containing 6-10 carbon atoms and especially an aromatic hydrocarbon radical; or a radical of formula II. In formulas I and II, $R^1$ may be aliphatic, alicyclic, aromatic (including aromatic radicals containing art-recognized substituents) or heterocyclic. It is usually lower alkylene and especially methylene.

The above-described epoxytriazine-capped polyphenylene ether compositions may be prepared by contacting under reactive conditions, in the presence of a basic reagent, at least one polyphenylene ether with an epoxychlorotriazine of the formula

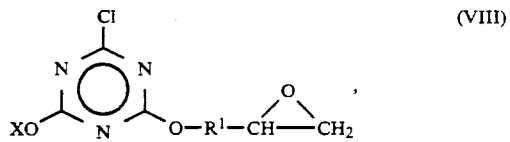

(VIII)

wherein $R^1$ and X are as previously defined.

Typical epoxychlorotriazines of formula VIII include 2-chloro-4,6-diglycidoxy-1,3,5-triazine (hereinafter "DGCC"), 2-chloro-4-(n-butoxy)-6-glycidoxy-1,3,5-triazine (hereinafter "BGCC") and 2-chloro-4-(2,4,6-trimethylphenoxy)6-glycidoxy-1,3,5-triazine (hereinafter "MGC may also be named as though derived from cyanuric acid and designated diglycidyl chlorocyanurate, n-butyl glycidyl chlorocyanurate and 2,4,6-trimethylphenyl glycidyl chlorocyanurate, respectively. They may be prepared, for example, by the reaction of 2,4,6-trichlorotriazine (cyanuric chloride) with glycidol or combinations thereof with n-butanol or mesitol. Cyanuric chloride and n-butyl dichlorocyanurate are both commercially available.

Intermediates such as DGCC, BGCC and MGCC and the method for their preparation are disclosed and claimed in copending, commonly owned application Ser. No. 144,901, filed Jan. 19, 1988, now U.S. Pat. No. 4,895,945. Their preparation is illustrated by the following examples; all parts and percentages in the examples herein are by weight unless otherwise indicated.

EXAMPLE 1

To a mechanically stirred solution of 220.8 g. (1.2 moles) cyanuric chloride in 1500 ml. chloroform, cooled to 0°-10° C., was added 266.4 g. (3.6 moles) glycidol in one portion. Aqueous sodium hydroxide (50% solution; 192 g.) was added to the mixture dropwise with stirring over about 3 hours maintaining the reaction temperature below 10° C. and preferably around 0°-5° C. The reaction mixture was allowed to warm slowly to room temperature. The chloroform layer was washed with distilled water until neutral and dried over magnesium sulfate. The reaction product was found by carbon-13 nuclear magnetic resonance to be 2-chloro-4,6-diglycidoxy-1,3,5-triazine (DGCC). Analysis by liquid chromatography showed about 95% (by weight) chlorodiglycidoxytriazine. The reaction mixture also was found to contain small amounts of triglycidoxytriazine and dichloroglycidoxytriazine.

EXAMPLE 2

To a magnetically stirred solution of 250 g. (1.125 moles) n-butyl dichlorocyanurate in 757 ml. chloroform, cooled to 0°-10° C., was added 250 g. (3.375 moles) glycidol in one portion. Aqueous sodium hydroxide (50% solution; 90 g.) was added to the mixture dropwise with stirring over about 2 hours, maintaining the reaction temperature below 10° C. and preferably around 0°-5° C. The reaction mixture was allowed to warm to room temperature over 30 minutes. The chloroform layer was washed with distilled water until neutral and dried over magnesium sulfate. Proton nuclear magnetic resonance analysis indicated a 95% yield of 2-chloro-4-(n-butoxy)-6-glycidoxy-1,3,5-triazine (BGCC).

EXAMPLE 3

To a mechanically stirred solution of 50 g. (0.175 mole) 2,4,6-trimethylphenyl dichlorocyanurate (prepared by the reaction of equimolar amounts of mesitol and cyanuric chloride) in 170 ml. methylene chloride, cooled to 0°-10° C., was added 26.38 g. (0.356 mole) glycidol in one portion. Aqueous sodium hydroxide (50% solution; 14.26 g.) was added to the mixture dropwise with stirring over about 25 minutes maintaining the reaction temperature between 0° and 10° C. and preferably around 0°-5° C. After stirring an additional 30 minutes, the reaction mixture was allowed to warm to room temperature. The methylene chloride layer was washed with distilled water until neutral and dried over magnesium sulfate. The reaction product was found by proton nuclear magnetic resonance to be 2-chloro-4-(2,4,6-trimethylphenoxy)-6-glycidoxy-1,3,5-triazine (MGCC).

Various options are available for the reaction of the polyphenylene ether with the epoxychlorotriazine. In one method, the reaction is conducted in solution in a non-polar organic liquid, typically at a temperature in the range of about 80°-150° C. and preferably about 100°-125° C. The basic reagent employed in this method should be soluble in the organic liquid and is generally a tertiary amine. Its identity is not otherwise critical, provided it is sufficiently nonvolatile to remain in the reaction mixture at the temperatures employed. Pyridine is often preferred.

The amount of epoxychlorotriazine employed in this option is generally in the range of about 1-20% by weight, based on polyphenylene ether. The amount of basic reagent is an effective amount to promote the reaction; in general, about 1.0-1.1 equivalent thereof per mole of chloroepoxytriazine is adequate.

The epoxytriazine-capped polyphenylene ethers made in solution by the above-described process are generally found to contain rather high proportions (e.g., at least about 0.4% by weight) of chemically combined chlorine, principally covalently bound. It is believed that the covalently bound chlorine is the result of epoxy groups competing with the organic base as a hydrogen chloride acceptor, with the formation of chlorohydrin moieties. This may be followed by condensation of said chlorohydrin moieties with additional epoxy groups to produce such molecular species as polyphenylene ether-epoxytriazine block copolymers and homopolymeric epoxytriazine oligomers.

Upon molding, compositions containing polyphenylene ether copolymers prepared from products containing such species form articles which are ductile but have impact strengths somewhat lower than desired under certain conditions. This is particularly true of copolymers with polyesters.

A second preferred method of preparation produces epoxytriazine-capped polyphenylene ethers with little or no covalently bound chlorine. In this method, the reaction is conducted interfacially in a medium comprising water and an organic liquid as previously described. The basic reagent is a water-soluble base, typically an alkali metal hydroxide and preferably sodium hydroxide. It may added to the mixture of epoxychlorotriazine and polyphenylene ether, or may initially react with the polyphenylene ether to form a salt which is then contacted with the epoxychlorotriazine. There is also employed a phase transfer catalyst. Any of such catalysts which are stable and effective under the prevailing reaction conditions may be used; those skilled in the art will readily perceive which ones are suitable. Particularly preferred are the tetraalkylammonium chlorides wherein at least two alkyl groups per molecule, typically 2 or 3, contain about 5-15 carbon atoms.

In this method, reaction temperatures in the range of about 20°-100° C. may be employed. The amount of epoxychlorotriazine is frequently lower than in the previously described method, typically in the range of about 1-6% and preferably about 2-6% by weight based on polyphenylene ether, since the reaction of the epoxychlorotriazine with the polyphenylene ether apparently proceeds more nearly to completion. Most often, the ratio of equivalents of base to moles of epoxychlorotriazine is about 0.5-1.5:1, and the weight ratio of phase transfer catalyst to base is about 0.01-0.3:1.

Still another method utilizes an organic liquid and a solid base, typically a solid alkali metal hydroxide or an anion exchange resin in the free base form. Chloride salts may be removed by methods known in the art, including water washing when a hydroxide is employed and filtration when an anion exchange resin is employed.

Regardless of which method of preparation is used, the epoxytriazine-capped polyphenylene ether may be isolated by conventional methods, typically by precipitation with a non-solvent. Among the non-solvents which may be employed are methanol, 1-propanol, acetone, acetonitrile and mixtures thereof.

When the non-solvent is an alcohol, and especially methanol, it may undergo base-promoted reaction with the epoxytriazine moieties on the capped polyphenylene ether, usually resulting in a loss of epoxide groups. Either or both of two operations may be employed to suppress this reaction. The first is to neutralize the reaction mixture with any convenient acidic compound; carbon dioxide, in gaseous, liquid or solid form, is often preferred. The second is to remove alcohol from contact with the product as rapidly and completely as possible by conventional means, typically including a subsequent drying step.

In the following examples which illustrate the preparation of epoxytriazine-capped polyphenylene ethers, proportions of epoxychlorotriazine are expressed as a percentage of polyphenylene ether. The following polyphenylene ethers were employed:

PPE—a poly(2,6-dimethyl-1,4-phenylene ether) having an intrinsic viscosity in chloroform at 25° C. of 0.40 dl./g.

VV—PPE which had been extruded on a twin screw extruder within the temperature range of about 260°-320° C., with vacuum venting to a maximum pressure of about 20 torr.

LN—a poly(2,6-dimethyl-1,4-phenylene ether) having an intrinsic viscosity of 0.57 dl./g., having a low proportion of nitrogen as a result of preparation with a catalyst containing no primary or secondary amine.

Percentages of epoxytriazine in the capped polymer were determined from the relative areas of peaks in the nuclear magnetic resonance spectrum attributable to hydrogen atoms in the epoxy and aromatic moieties. Chlorine percentages were determined by quantitative X-ray fluorescence.

EXAMPLES 4-14

To solutions of 400 grams of polyphenylene ether in 2500 ml. of toluene were added, with stirring, various quantities of pyridine followed by various quantities of epoxychlorotriazines, added in portions. The ratio of equivalents of pyridine to moles of epoxychlorotriazine was 1.04:1. The solutions were heated under reflux for various periods of time, after which the products were precipitated with methanol in a blender, filtered, washed with methanol and vacuum dried. The relevant parameters and analytical results are given in Table I.

TABLE I

| Example | Polyphenylene ether | Epoxychlorotriazine Identity | % | Reaction time, hrs. | % epoxytriazine | % chlorine |
|---|---|---|---|---|---|---|
| 4 | PPE | DGCC | 5 | 2 | 0.52 | — |
| 5 | PPE | DGCC | 5 | 3 | 0.62 | — |
| 6 | VV | DGCC | 5 | 1 | 0.43 | 0.42 |
| 7 | VV | DGCC | 5 | 2 | 0.65 | — |
| 8 | VV | DGCC | 5 | 3 | 0.63 | 0.47 |
| 9 | VV | DGCC | 2.5 | 3.5 | 0.24 | — |
| 10 | VV | DGCC | 15 | 3 | 2.1 | 1.8 |
| 11 | VV | DGCC | 15 | 3 | 1.9 | — |
| 12 | VV | BGCC | 5 | 3 | 0.50 | — |
| 13 | VV | BGCC | 5 | 3 | 0.40 | — |
| 14 | VV | BGCC | 15 | 3 | 1.79 | — |

EXAMPLES 15-25

To solutions of 400 grams of polyphenylene ether in 2500 ml. of toluene were added various quantities of epoxychlorotriazines dissolved in a small amount of methylene chloride. There were then added 48 grams of a 10% solution in toluene of a commercially available methyltrialkylammonium chloride in which the alkyl groups contained 8-10 carbon atoms, and 10% aqueous sodium hydroxide solution in the amount of 1.3 equivalents of sodium hydroxide per mole of epoxychlorotriazine. The mixtures were stirred vigorously for various periods at 25°-40° C., after which the products were precipitated with methanol in a blender and rapidly filtered, washed with methanol and vacuum dried.

The results are given in Table II. Chlorine proportions were less than 200 ppm., the minimum detectable by quantitative X-ray fluorescence.

TABLE II

| Example | Polyphenylene ether | Epoxychlorotriazine Identity | % | Reaction time, min. | % epoxytriazine |
| --- | --- | --- | --- | --- | --- |
| 15 | PPE | DGCC | 1.5 | 30 | 0.52 |
| 16 | PPE | DGCC | 2.0 | 30 | 1.03 |
| 17 | PPE | DGCC | 2.5 | 30 | 0.95 |
| 18 | PPE | DGCC | 3.0 | 30 | 0.96 |
| 19 | PPE* | DGCC | 3.0 | 30 | 1.01 |
| 20** | PPE | DGCC | 3.0 | 30 | 1.24 |
| 21 | LN | DGCC | 3.0 | 30 | 0.48 |
| 22 | PPE | DGCC | 5.0 | 30 | 1.40 |
| 23 | VV | DGCC | 5.0 | 10 | 0.68 |
| 24 | PPE | BGCC | 3.0 | 30 | 1.25 |
| 25 | PPE | MGCC | 3.0 | 30 | 1.50*** |

*16% slurry of crude PPE in toluene.
**Reaction mixture neutralized with gaseous carbon dioxide.
***Average of 3 runs.

The olefin polymers (hereinafter sometimes designated "polyolefins") which may be used in the preparation of the compositions of this invention are homopolymers and copolymers of known aliphatic olefins including ethylene, propylene, 1-butene, 2-butene, 1-pentene, 2-pentene, 2-methyl-1-pentene, 3-methyl-1-pentene, 1-octene and 1-dodecene. The $C_{2-6}$ olefins are preferred, with ethylene and propylene being most preferred.

For the purposes of the invention, it is essential for the polyolefin to have highly nucleophilic substituents capable of reaction with the epoxy groups of the polyphenylene ether. Those skilled in the art will be familiar with suitable substituents; examples are carboxylic acid groups and anhydrides and acidic esters thereof, sulfonic acid groups and amine groups. The carboxylic acid-derived groups are preferred by reason of their availability and the high stability of copolymers prepared therefrom.

The substituents may be incorporated in the polyolefin by employing suitable functional comonomers, such as acrylic acid, maleic anhydride or allylamine, in the formation thereof. They may also be provided by graft polymerization on an already prepared polyolefin, using the same monomers, or by other art-recognized means of functionalization.

Any of the commercially available graft-functionalized polyolefins may be used, or suitable polymers may be prepared from commercially available unfunctionalized polyolefins such as low density polyethylene, high density polyethylene and polypropylene. The preparation of suitable polyolefins containing carboxylic acid anhydride groups is illustrated by the following examples.

EXAMPLE 26

An intimate blend of 500 parts of a commercially available polypropylene having a melt flow index of 5, 20 parts of styrene, 20 parts of maleic anhydride and 0.5 part of dicumyl peroxide was extruded at 260° C. on a 20-mm. twin screw extruder. The extrudate was dissolved in hot xylene, the solution was cooled and the polymer was precipitated by pouring into acetone. It was shown by analysis to contain 1.5% bound maleic anhydride.

EXAMPLE 27

An intimate mixture of 500 parts of a commercially available linear low density polyethylene, 10 parts of maleic anhydride and 0.5 part of dicumyl peroxide was extruded and isolated as in Example 26. Analysis showed that grafting had proceeded to a level of at least 95%.

EXAMPLE 28

A mixture of 900 parts of the maleic anhydride-grafted linear low density polyethylene of Example 27 and 3 liters of water was heated under reflux for 15 hours. The polymer pellets were filtered and dried. Fourier transform infrared spectroscopy showed complete hydrolysis of the anhydride moieties to carboxylic acid groups.

EXAMPLE 29

A mixture of 1000 parts of linear low density polyethylene, 20 parts of monoethyl fumarate and 1 part of a commercially available peroxide initiator was extruded as in Example 26, but at a temperature of 190° C. Analysis indicated at least 90% grafting with less than 10% ring closure.

Either solution or melt blending procedures may be employed for the preparation of the compositions of this invention. Typical reaction temperatures are in the range of about 175°–350° C. Thus, relatively high boiling solvents such as o-dichlorobenzene or 1,2,4-trichlorobenzene are preferred for solution reactions.

Melt reaction procedures are frequently preferred because of the availability of melt blending equipment in commercial polymer processing facilities. Conventional equipment of this type is suitable, with the use of extrusion equipment generally being convenient and therefore often preferred.

In certain situations, blending of the polyphenylene ether and the olefin polymer may be incomplete if there is a substantial discrepancy between the melt viscosities of the two resins. For example, a low molecular weight polypropylene has a much higher melt flow index than a typical polyphenylene ether. In this case, there may be little or no copolymer formation. The proportion of copolymer may be increased by including in the blend a higher molecular weight unfunctionalized polyolefin which has a lower melt flow index. Said unfunctionalized polyolefin apparently dissolves the lower molecular weight functionalized polyolefin to form a blend having a better melt viscosity match with the polyphenylene ether.

The reactions which take place between the polyphenylene ether containing epoxytriazine groups and the polyolefin generally are illustrated by those involving carboxylic acid groups of the latter, which open the epoxide rings to form hydroxy ester groups. Thus, a preferred embodiment of the invention is polyphenylene ether-polyolefin copolymers comprising molecules containing at least one polyphenylene ether-polyolefin linkage of the formula

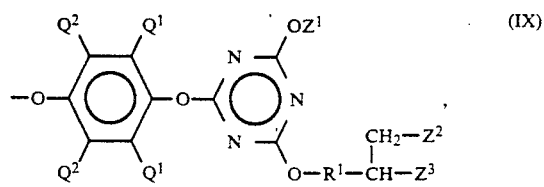

(IX)

wherein $Q^1$, $Q^2$ and $R^1$ are as previously defined; $Z^1$ is an alkyl, cycloalkyl or aromatic radical (most often lower alkyl or aromatic hydrocarbon) or

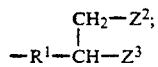

and $Z^2$ is OH and $Z^3$ is

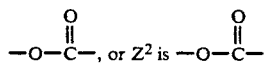

and $Z^3$ is OH.

The proportions of polyphenylene ether and polyolefin employed for the preparation of the compositions of this invention are not critical; they may be widely varied to provide compositions having the desired properties. Most often, each polymer is employed in an amount in the range of about 5–95%, preferably about 30–70%, of the composition by weight.

For the most part, the compositions of this invention contain various proportions of homopolymeric polyphenylene ether and polyolefin in addition to copolymer. This may be the result of incorporation of excess polyolefin or unfunctionalized polyphenylene ether therein, incomplete reaction of the epoxychlorotriazine with the polyphenylene ether, or incomplete reaction of the polyphenylene ether with the olefin polymer. In any event, molded parts produced from said compositions are generally ductile and have higher impact strengths than those produced from simple polyphenylene ether-polyolefin blends, which are incompatible and often exhibit delamination as previously described.

The compositions of this invention may contain other constituents in addition to the polyphenylene ether, polyolefin and copolymer thereof. Examples are elastomeric impact modifiers compatible with either or both of the polyphenylene ether and the polyolefin. When employed, they are usually present in the amount of about 5–25% by weight based on total resins.

Suitable impact modifiers include various elastomeric copolymers, of which examples are ethylene-propylenediene polymers (EPDM's); carboxylated ethylene-propylene rubbers; polymerized cycloalkenes; block copolymers of alkenylaromatic compounds such as styrene with polymerizable olefins or dienes, including butadiene, isoprene, chloroprene, ethylene, propylene and butylene; and core-shell elastomers, including those containing a poly(alkyl acrylate) core attached to a polystyrene shell via an interpenetrating network, and more fully disclosed in U.S. Pat. No. 4,681,915.

The preferred impact modifiers are block (typically diblock, triblock or radial teleblock) copolymers of alkenylaromatic compounds and dienes. Most often, at least one block is derived from styrene and at least one other block from at least one of butadiene and isoprene. Especially preferred are the triblock copolymers with polystyrene and blocks and diene-derived midblocks. It is frequently advantageous to remove (preferably) or decrease the aliphatic unsaturation therein by selective hydrogenation. The weight average molecular weights of the impact modifiers are typically in the range of about 50,000–300,000. Block copolymers of this type are commercially available from Shell Chemical Company under the trademark KRATON, and include KRATON D1101, G1650, G1651, G1652, G1657 and G1702.

While the aforementioned impact modifiers are uniformly effective to improve the impact strengths of the compositions of this invention, they are not always necessary. For example, functionalized linear low density polyethylenes form compositions with high impact strength even in the absence of impact modifiers. The impact strengths of such blends can, however, be still further increased by the addition of impact modifiers.

Finally, the compositions of this invention may also contain conventional ingredients such as fillers, flame retardants, pigments, dyes, stabilizers, anti-static agents, crystallization aids, mold release agents and the like, as well as resinous components not previously discussed.

The preparation and properties of the compositions of this invention are illustrated by the following examples. The following elastomeric impact modifiers were employed:

A—a commercially available EPDM elastomer.

B—a commercially available triblock copolymer comprising 29% polystyrene end blocks having weight average molecular weights of 7,000 and 71% hydrogenated butadiene midblock having a weight average molecular weight of 37,500.

C—a commercially available styrene-butadiene diblock copolymer having a weight average molecular weight of about 164,000.

EXAMPLE 30

A well-mixed dry blend was prepared from 50 parts of an MGCC-capped polyphenylene ether prepared in accordance with Example 25 and containing 0.3% glycidoxy groups by analysis and 50 parts of the maleic anhydride-grafted polypropylene of Example 26, and extruded on a single-screw extruder at 400 rpm. and 245°–275° C. The extrudate was quenched in water, pelletized and extracted with chloroform to remove unreacted polyphenylene ether. On the assumption that all polyphenylene ether remaining in the residue was bound to polypropylene to form copolymer, 38% of the polyphenylene ether was copolymerized.

EXAMPLE 31

The procedure of Example 30 was repeated, substituting for the MGCC-capped polyphenylene ether a DGCC-capped polymer prepared according to Example 15 and containing 0.6% glycidoxy groups. The proportion of polyphenylene ether copolymerized was 18%.

Comparison was made with two controls employing uncapped or capped polyphenylene ether and ungrafted polypropylene. No copolymer was observed in either case.

EXAMPLE 32

A solution in 200 ml. of 1,2,4-trichlorobenzene of 5 grams of the capped polyphenylene ether employed in Example 31 and 5 grams of a commercially available maleic anhydride-grafted polypropylene having a melt flow index of 660 and containing 0.5% maleic anhydride was heated under reflux for 4 hours. The polymeric product was precipitated by pouring into methanol, removed by filtration, dried and extracted with chloroform; it contained 30% copolymerized polyphenylene ether.

EXAMPLE 33

Following the procedure of Example 30, various proportions of the capped polyphenylene ether and maleic anhydride-grafted polypropylene employed in Example 32, and, in certain instances, an ungrafted polypropylene having a melt flow index of 5, were prepared by extrusion and were analyzed for copolymer formation. The results are given in Table III.

TABLE III

| Polyphenylene ether, % | 40 | 40 | 40 | 40 |
|---|---|---|---|---|
| Grafted polypropylene, % | 60 | 40 | 30 | 20 |
| Ungrafted polypropylene, % | — | 20 | 30 | 40 |
| Copolymerized polyphenylene ether, % | 0 | 8 | 15-25 | 18 |

These results show the importance of employing a polypropylene having a good melt viscosity match with the polyphenylene ether when preparing compositions of this invention by melt processing.

EXAMPLES 34-35

The procedure of Example 33 was employed in the preparation of resin blends from the capped polyphenylene ether of Example 31, a commercially available maleic anhydride-grafted polypropylene containing 1.5% maleic anhydride units, and various impact modifiers. The extrudates were oven dried and molded into test specimens which were tested for notched Izod impact strength (ASTM procedure D256) and heat distortion temperature at 0.455 MPa. (ASTM procedure D648). The results are given in Table IV, in comparison with a control prepared from uncapped polyphenylene ether and unfunctionalized polypropylene.

TABLE IV

| | Example | | |
|---|---|---|---|
| | 34 | 35 | Control |
| Polyphenylene ether, %: | | | |
| Uncapped | — | — | 45.5 |
| Example 31 | 45.5 | 45.5 | — |
| Polypropylene. %: | | | |
| Unfunctionalized | — | — | 45.5 |
| Functionalized | 45.5 | 45.5 | — |
| Impact modifier, %: | | | |
| A | 9.0 | — | 9.0 |
| B | — | 9.0 | — |
| Izod impact strength, joules/m. | 107 | 150 | 32 |
| Heat distortion temp., °C. | 127 | 113 | — |

EXAMPLES 36-37

The procedures of Examples 30-31 were repeated, substituting for the functionalized polypropylene the maleic anhydride-grafted linear low density polyethylene of Example 27. The results are given in Table V.

TABLE V

| | Example | |
|---|---|---|
| | 39 | 40 |
| Epoxychlorotriazine | MGCC | DGCC |
| Glycidyl groups, % | 0.3 | 0.6 |
| Copolymerized polyphenylene ether, % | 40 | 20 |
| Izod impact strength, joules/m. | 641 | 390 |

EXAMPLE 38

Following the procedure of Examples 36-37, a copolymer composition was prepared using a DGCC-capped polyphenylene ether containing 0.6% glycidyl groups and the functionalized linear low density polyethylene of Example 28. It was found to contain 15% bound polyphenylene ether and had an Izod impact strength of 411 joules/m.

EXAMPLES 39-40

Compositions similar to those of Examples 34-35 were prepared from a DGCC-capped polyphenylene ether containing 0.6% glycidyl groups, the functionalized high density polyethylene of Example 27 and (in Example 39) EPDM as an impact modifier. The results are given in Table VI, in comparison with two controls employing uncapped polyphenylene ether and unfunctionalized high density polyethylene.

TABLE VI

| | Example | | Control | |
|---|---|---|---|---|
| | 39 | 40 | 1 | 2 |
| Polyphenylene ether, %: | | | | |
| Uncapped | — | — | 50 | 45.5 |
| Capped | 45.5 | 50 | — | — |
| Polyethylene, %: | | | | |
| Unfunctionalized | — | — | 50 | 45.5 |
| Functionalized | 45.5 | 50 | — | — |
| Impact modifier, % | 9.0 | — | — | 9.0 |
| Izod impact strength, joules/m. | 304 | 64 | 16 | 32 |
| Heat distortion temp., °C. | 121 | — | 135 | — |

What is claimed is:

1. A composition comprising copolymers prepared by the reaction of a polyphenylene ether containing epoxytriazine groups with at least one aliphatic olefin polymer containing highly nucleophilic substituents.

2. A composition according to claim 1 wherein the highly nucleophilic substituents are carboxylic acid groups or anhydrides or acidic esters thereof.

3. A composition according to claim 2 wherein the polyphenylene ether comprises a plurality of structural units having the formula

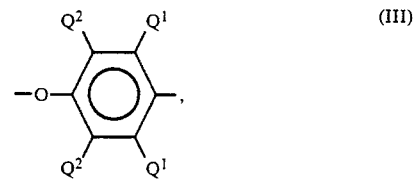

(III)

wherein in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atom; and each $Q^2$ is independently hydrogen, halogen, primary or secondary lower alkyl, phenyl, haloalkyl, hydrocarbonoxy or halohydrocarbonoxy as defined for $Q^1$.

4. A composition according to claim 3 which comprises molecules containing at least one polyphenylene etherolefin polymer linkage of the formula

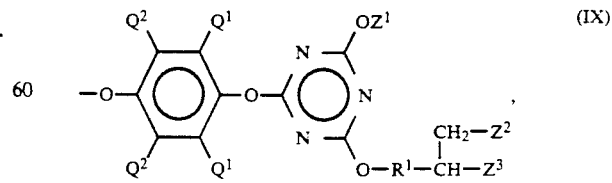

(IX)

wherein $R^1$ is a divalent aliphatic, alicyclic, heterocyclic or unsubstituted or substituted aromatic hydrocarbon radical; $Z^1$ is an alkyl, cycloalkyl or aromatic radical, or

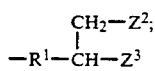

and $Z^2$ is OH and $Z^3$ is

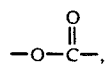

or $Z^2$ is

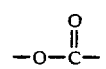

and $Z^3$ is OH.

5. A composition according to claim 4 wherein the olefin polymer is polyethylene or polypropylene.

6. A composition according to claim 5 wherein the polyphenylene ether is a poly(2,6-dimethyl-1,4-phenylene ether).

7. A composition according to claim 6 wherein $Z^1$ is a lower alkyl or aromatic hydrocarbon radical.

8. A composition according to claim 7 wherein $Z^1$ is n-butyl or 2,4,6-trimethylphenyl.

9. A composition according to claim 6 wherein $Z^1$ is

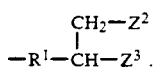

10. A composition according to claim 9 wherein the olefin polymer is linear low density polyethylene.

11. A composition according to claim 9 wherein the olefin polymer is polypropylene or high density polyethylene.

12. A composition according to claim 9 which also contains an elastomeric impact modifier.

13. A composition according to claim 12 wherein the olefin polymer is polypropylene or high density polyethylene.

14. A composition according to claim 12 wherein the impact modifier is a diblock or triblock copolymer of styrene and at least one of isoprene and butadiene.

15. A composition according to claim 13 wherein the aliphatic unsaturation in the isoprene or butadiene has been removed by selective hydrogenation.

16. A composition comprising polyphenylene etherolefin polymer copolymers prepared by the reaction of:
at least one aliphatic olefin polymer containing highly nucleophilic substituents, with
a composition prepared by contacting under reactive conditions, in the presence of a basic reagent, at least one polyphenylene ether with an epoxychlorotriazine of the formula

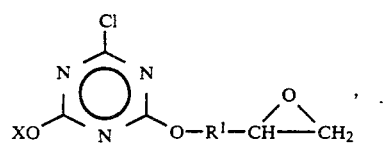 (VIII)

wherein:
X is an alkyl, cycloalkyl or aromatic radical or

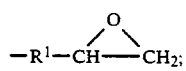 (II)

and
$R^1$ is a divalent aliphatic, alicyclic, heterocyclic or unsubstituted or substituted aromatic hydrocarbon radical.

17. A composition according to claim 16 wherein the polyphenylene ether is a poly(2,6-dimethyl-1,4-phenylene ether).

18. A composition according to claim 17 wherein the olefin polymer is polyethylene or polypropylene and the highly nucleophilic substituents are carboxylic acid groups or anhydrides or acidic esters thereof.

19. A composition according to claim 18 wherein $R^1$ is methylene.

20. A composition according to claim 19 wherein the olefin polymer is linear low density polyethylene.

21. A composition according to claim 19 wherein the olefin polymer is polypropylene or high density polyethylene.

22. A composition according to claim 19 which also contains an elastomeric impact modifier.

23. A composition according to claim 19 wherein the olefin polymer is polypropylene or linear low density polyethylene.

* * * * *